Nov. 11, 1941. A. H. HARTWIG Re. 21,942

CAR DOOR LOCK

Original Filed Feb. 15, 1937 2 Sheets-Sheet 1

Inventor:
Arthur H. Hartwig
by Oscar Hochberg,
his Attorney

Nov. 11, 1941. A. H. HARTWIG Re. 21,942
CAR DOOR LOCK
Original Filed Feb. 15, 1937 2 Sheets-Sheet 2
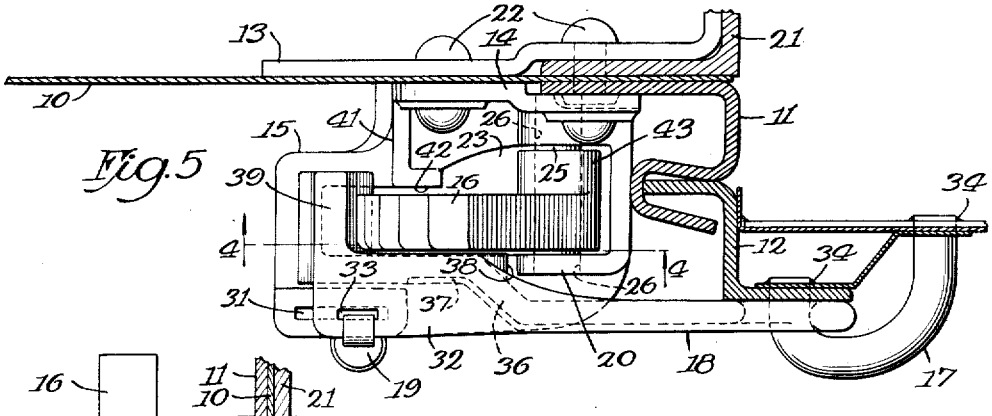
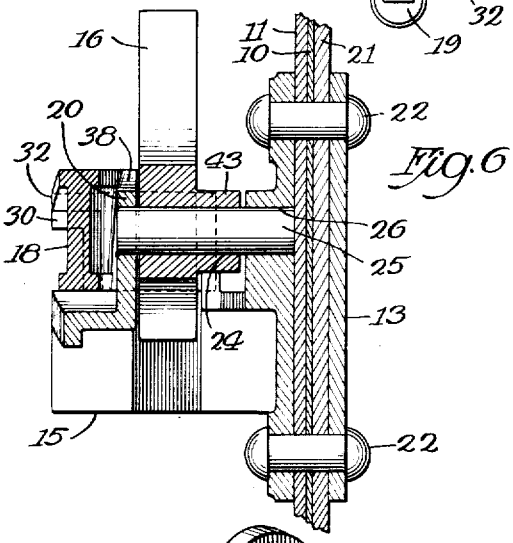
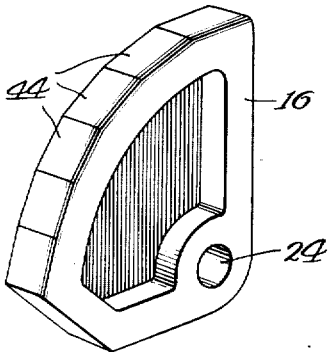
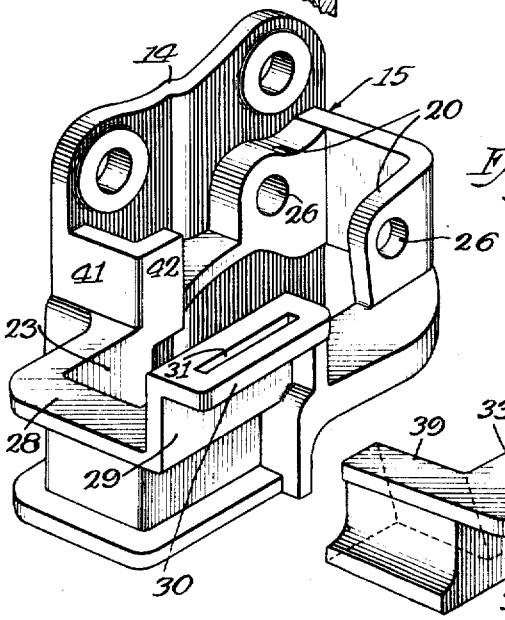
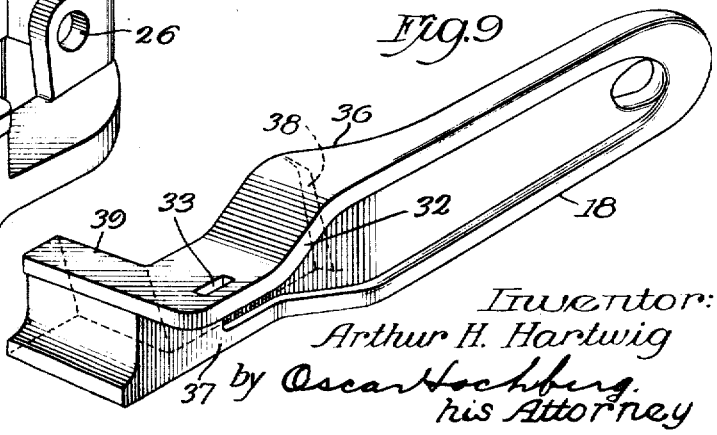
Inventor:
Arthur H. Hartwig
by Oscar Hochberg,
his Attorney Reissued Nov. 11, 1941

Re. 21,942

UNITED STATES PATENT OFFICE 21,942

CAR DOOR LOCK

Arthur H. Hartwig, Michigan City, Ind., assignor to Pullman-Standard Car Manufacturing Company, Chicago, Ill., a corporation of Delaware Original No. 2,148,158, dated February 21, 1939, Serial No. 125,912, February 15, 1937. Application for reissue August 2, 1940, Serial No. 349,986

9 Claims. (Cl. 292—285)

This invention relates to sliding door locks and slack take-up arrangements therefor and, more particularly, to a combination lock and slack take-up device for use on railway freight cars having sliding doors of either the single or double type.

It is an object of this invention to provide a lock for the sliding doors of freight cars wherein, during transit, the inherent tendency is to urge the door towards fully closed position.

The particular object of the invention is the provision of means for maintaining the sliding side doors of railway freight cars more positively in closed position and the elimination of unnecessary lost motion and slack as the door is jolted about by movement of cars in a train.

Another object of the invention is the provision of a lock member permanently secured to the car and incapable of being removed or lost therefrom.

A further object of the invention is the provision of locking means for sliding doors utilizing a pivoted cam member and a pivoted hasp lever member having an inclined engaging surface for co-operation therewith.

A still further object of the invention is the provision of a sliding door lock and slack take-up mechanism of simple form designed to reduce to a minimum the number of devices operable in the closing and locking of the door.

The foregoing and other objects are attained by the mechanism illustrated in the accompanying drawings, in which Fig. 1 is a side elevational view of a fragment of a railway freight car and door to which the invention is applied and shown in full detail as it would appear with the door in closed position and locked with seal;

Fig. 5 is a plan view of the lock with the car side and door in section and the parts in the same relation as shown in Fig. 1;

Fig. 6 is a vertical, transverse, sectional view taken on the line 6—6 of Fig. 1 through the pivotal point of the cam and bracket with the hasp in place; and Figs. 7, 8 and 9 are detail, perspective views of the cam, hasp bracket and hasp, respectively.

Figure 2:
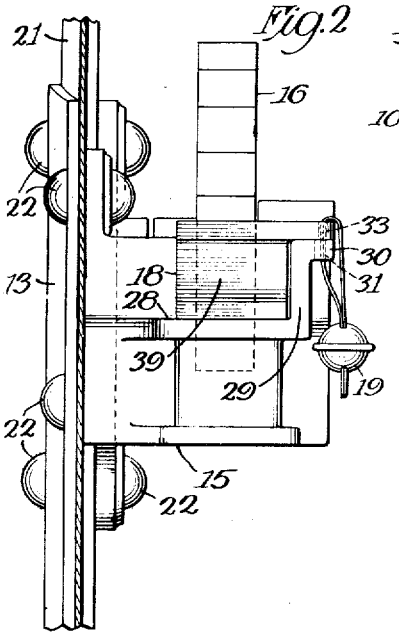
Fig. 2 is an end elevational view of the lock in the position shown in Fig. 1 and showing the reinforcing means for the attachment of the hasp bracket to the car.

In devices of the prior art seeking to accomplish the same purpose as the present invention, wedge members have been utilized for taking up the slack between a hasp and lock member in which the wedge moved in two directions; and, due to friction between the engaging surfaces of the parts during such movement, the wedge could not drop quickly enough to take up the existing slack before the door again moved away. In this invention, that objection is overcome by the use of a pivoted cam member designed to gravitate to a more advanced holding position as the hasp advances towards the closed position of the door.

In the drawings, 10 represents a car side to which is attached a spark strip 11 for the reception of the sliding door front edge frame member 12 providing sealing engagement therebetween. Mounted upon the side 10 and secured to the spark strip 11 and backed up by a reinforcing plate 13 is a cam bracket or lock member 15, more fully hereinafter described, and to which is pivoted a cam member 16. Loosely secured to the door and preferably to the door frame member by means of a staple or fastener 17 is a hasp member 18 which, in the closed position of the door, is adapted to be engaged between the bracket 15 and the cam 16 and is constructed in such manner that when a sealing member 19 between the hasp and bracket is in place the door may not be opened without breaking the seal; but, if the door is not fully closed when locked, the slack will be taken up and the door automatically drawn to closed position as the car of which it is a part is jolted or lurched about in transit. The cam member 16 exerts a force between the bracket 15 and the hasp member 18 tending always to draw those members together.

The mounting of the cam member 16 between the lock member 15 and hasp member 18 is such that the cam-mounting member is provided with an aperture for the reception of the cam pivoted upon that member and through which the cam oscillates to engage the other member and draw the respective members together with the cam-engaging portion of the other member bridging the aperture for the cam. The bracket or lock member 15 is secured to the car side and to the door post member 21 and spark strip 11 by means of rivets 22. The wall 14 of the bracket is offset from the car side 10 to accommodate the spark strip 11 between them. An aperture 23 is provided in the bracket accommodating the cam member 16 which is pivoted in the bracket at 24. The pin 25, providing a bearing upon which the cam is pivoted, is mounted in the holes 26 in jaws 20 disposed upon opposite sides of the cam and supporting the pin in double shear against stresses imposed by the weight of the door constantly tugging at the lock. The pin is securely held in place by means of welding, as at 27. The bracket 15 is provided with a rest 28 affording a seating surface over which the hasp member 18 is adapted to slide and with a restraining wall 29 between which and the outer side of cam 16 the hasp 18 is held in alignment for engagement between the respective bearing faces of the cam and hasp. The upper extremity of the wall 29 is directed horizontally outward, as at 30, and provided with an elongated slot 31 disposed vertically through the shelf thus afforded; and the hasp 18 likewise is provided with a horizontal flange 32 in overlapping relation to the shelf 30 and having a slot 33 in vertical alignment with the slot 31 in the bracket through both of which the sealing member 19 is adapted to extend. The slot 33 in the hasp is only of sufficient size to take the sealing member 19, but the slot 31 in the bracket, being elongated, is adapted to accommodate the longitudinal movement of the hasp without damaging the seal member as the sliding door moves one way or the other.

The hasp member 18 is loosely pivoted to the door by means of a hasp fastener in the form of a staple 17—the legs of which penetrate the door frame member 12 and the door and secured thereto by welding preferably on the inner side as shown at 34 in Fig. 5. The hasp is offset inwardly at 36 from its outermost plane, providing a portion 37 disposed between the cam 16 and wall 29 of the bracket 15 and affording a shoulder 38 in direct abutting relation to the outermost jaw 20 of the bracket, thereby providing a positive stop to movement of the hasp in a direction tending to open the door. From the offset portion 37, the extremity of the hasp is directed inwardly, as at 39, and provided with a sloped surface 40 engaged by the cam 16 for pulling the door to closed position. The inwardly extending portion 39 is of sufficient extent to rest upon the shelf 28 in the area upon both sides of the opening 23, as well as upon the end portion, so that there is no eccentricity in its support. The extension 39 also supplements the shoulder 38 in providing a limitation of movement of the hasp towards open position of the door in that it strikes the wall 41 on the bracket 15 at the inner side of the cam 16 at approximately the same time as the shoulder 38 strikes the jaw 20. The wall 41 terminates in a portion 42 paralleling the opening 23 and providing a guiding face for the cam. The lock member 15 is mounted upon the car side in abutting relationship with the spark strip 11 so that when the door is urged closed under action of the cam and hasp, the spark strip is effectively backed up by the bracket and relieved of stresses that would otherwise be imposed.

Figure 4:
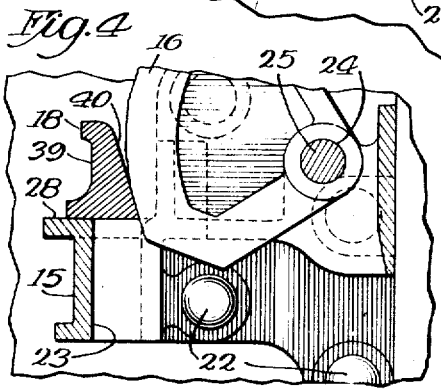
Fig. 4 is a sectional view through the bracket and hasp taken on the line 4—4 of Fig. 5 showing the relation between the hasp and cam with respect to the bracket when the lowermost facet on the bearing face of the cam engages the bearing surface of the hasp.

The pivoted cam member 16, as shown, is provided with a plurality of facets 44 adapted individually to engage the sloped bearing surface 40 on the hasp 18, and each facet, as the hasp and cam advance, engages the bearing face 40 at a point below the pivotal center of the cam, as best shown in Fig. 4, so that any backward thrust on the hasp is delivered to the surface of the cam at a point beyond dead center, tending further to lock the cam and prevent backward movement of the door. Although the cam is shown as being faceted, this same action might be obtained even though the cam should have a smoothly curved engaging surface. In any event, the door cannot become loose once the slack is taken up due to the pivotal point of the cam being above the point of engagement between the surfaces of the cam and hasp and with respect to the fastening of the hasp to the door. The cam 16 is also provided with an embossment 43 affording an extended bearing surface for the pivotal point 24.

Figure 1:
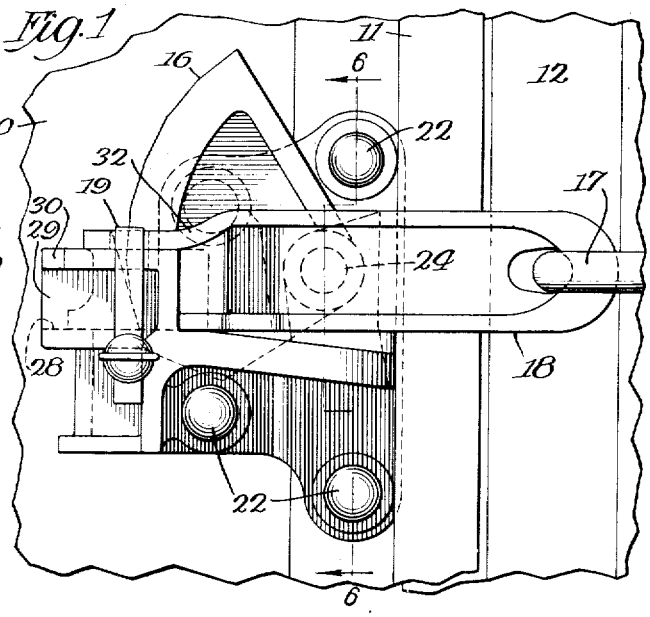
Figure 3:
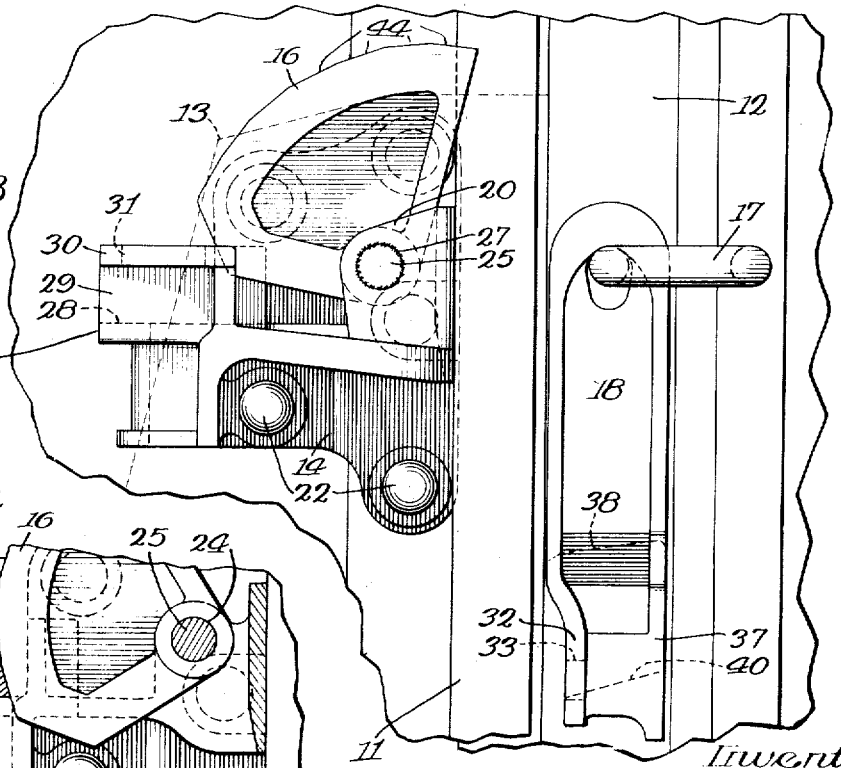
Fig. 3 is a view similar to Fig. 1 with the door closed but with the hasp in detached position and the cam in position for the hasp to be entered in the bracket.

In the actual operation of the device upon a car, the door is forced as near to its fully closed position as possible and the cam 16 raised to its uppermost position, as shown in Fig. 3, in which position it must be held while the hasp 18 is put in place and the cam then dropped into engagement therewith in tangential relation thereto, as shown in Fig. 4 and in Fig. 1, and then driven home to draw the door frame member 12 tightly against the spark strip 11—effectively sealing the door opening and in place securely to lock the door by the insertion of sealing member 19 continuously through the respective adjacent slots 33 and 31 in the hasp and bracket 15, as best shown in Fig. 2. Should the operator fail to draw the door tightly closed by driving the cam down, this will be accomplished automatically as the car is bumped or moved in a direction causing the door to lunge towards closed position. The cam 16 will drop by gravity and take up the existing slack. The device is unlocked by merely reversing the above sequence of operations.

From the foregoing, it will be seen that there has been provided a positive slack take-up device for use on sliding doors which will maintain the doors tightly closed and adapted to be securely locked and which may be released easily and quickly.

What is claimed is:

1. In a door lock, the combination comprising a lock member and a hasp member mounted respectively on relatively slidable parts for relative movement, said hasp member cooperably engaging said lock member, said lock member being provided with an aperture for the reception of a cam pivoted upon said lock member engaging said hasp member to draw said members together, said cam-engaging portion of the hasp member bridging the aperture for the cam member, between a portion at least of the hasp member and one of said slidable parts, and means for preventing the hasp member from swinging outwardly away from said slidable parts.

2. In a door lock, the combination comprising a lock member having an aperture, and a hasp member mounted respectively upon relatively slidable members, said hasp member having a right-angular extension bridging a portion of said aperture, and a lost motion take-up device secured in said lock member adapted to engage the hasp member and oscillate through said aperture, between a portion at least of the hasp member and one of said slidable members, and means for preventing said hasp member from swinging outwardly away from said slidable members.

3. In a door lock, the combination comprising a lock member having an aperture and a shoulder, and a hasp member, said members being mounted respectively on relatively slidable parts for movement towards and away one from the other, said hasp member having a right angular extension bridging a portion of said aperture, a lost motion take-up device secured in said lock member adapted to engage said hasp member to draw said members together and oscillate through said aperture between a portion at least of the hasp member and one of said slidable parts, means for preventing said hasp member from swinging outwardly away from said slidable parts, and a shoulder on the hasp member in direct abutting relation to the shoulder on the lock member adapted to limit reverse movement of the hasp member.

4. In a door lock, the combination comprising a lock member having an aperture, and a hasp member, said members being mounted respectively on relatively slidable parts for movement towards and away one from the other, said hasp member terminating in a right-angular extension bridging a portion of said aperture, a cam device pivotally secured in said lock member adapted to engage said extension to draw said members together and oscillate through said aperture between a portion at least of the hasp member and one of said slidable parts, and means for preventing said hasp member from swinging outwardly away from said slidable parts, the point of engagement between said cam device and hasp member being beyond the dead center of the cam device to prevent reverse movement of the hasp member.

5. In a door lock, the combination comprising a lock member and a hasp member mounted respectively on relatively slidable parts for relative movement, said hasp member cooperably engaging said lock member, one of said members being provided with an aperture for the reception of a cam pivoted on that member between at least a portion of the hasp member and one of said slidable parts and engaging the other member to draw said members together, said cam-engaging portion of the latter member bridging the aperture for the cam in the cam-mounting member, and means for preventing said hasp member from swinging outwardly away from said slidable parts.

6. In a door lock, the combination comprising a lock member and a hasp member mounted respectively upon relatively slidable parts, one of said members having an aperture and the other of said members having a portion bridging said aperture, and a lost-motion take-up device secured in one of said members between at least a portion of the hasp member and one of said slidable parts adapted to engage between the hasp and lock members and oscillate through said aperture, and means for preventing said hasp member from swinging outwardly away from said slidable parts.

7. In a door lock, the combination comprising a lock member having a shoulder, and a hasp member, said members being mounted respectively on relatively slidable parts for movement towards and away one from the other, one of said members having an aperture and the other of said members having a portion bridging said aperture, a lost-motion take-up device secured in one of said members adapted to engage between the hasp and lock members to draw said members together and oscillate through said aperture between a portion at least of said hasp member and one of said slidable parts, means for preventing said hasp member from swinging outwardly away from said slidable parts, and a shoulder on the hasp member in direct abutting relation to the shoulder on the lock member adapted to limit reverse movement of the hasp member.

8. In a door lock, the combination comprising a lock member having a shoulder, and a hasp member, said members being mounted respectively on relatively slidable parts for movement towards and away one from the other, one of said members having an aperture, the other of said members having a portion bridging said aperture, a lost-motion take-up device secured in one of said members adapted to engage said bridging portion to draw said members together and oscillate through said aperture between a portion at least of said hasp member and one of said slidable parts, and means for preventing said hasp member from swinging outwardly away from said slidable parts, said hasp member having a shoulder in direct abutting relation to the shoulder on the lock member adapted to limit reverse movement of the hasp member.

9. In a door lock, the combination comprising a lock member and a hasp member mounted respectively on relatively slidable parts for movement towards and away from each other, one of said members having an aperture and the other of said members having a right-angular extension bridging a portion of said aperture, a cam device pivotally secured in the apertured member between at least a portion of the hasp member and one of said slidable parts and adapted to engage said extension on the other member to draw said members together and adapted to oscillate through said aperture, the point of engagement between said cam device and extension being beyond the dead center of the cam device to prevent reverse movement of said cam mounting member, and means for preventing said hasp member from swinging outwardly away from said slidable parts.

ARTHUR H. HARTWIG.